(12) United States Patent
Adhikari

(10) Patent No.: US 8,358,932 B2
(45) Date of Patent: Jan. 22, 2013

(54) ALL-OPTICAL DATA CENTER NETWORK

(76) Inventor: Prasanna Adhikari, San Diego, CA (US)

(*) Notice: Subject to any disclaimer, the term of this patent is extended or adjusted under 35 U.S.C. 154(b) by 378 days.

(21) Appl. No.: 12/799,999

(22) Filed: Jul. 6, 2010

(65) Prior Publication Data

US 2012/0008947 A1    Jan. 12, 2012

(51) Int. Cl.
*H04J 14/02* (2006.01)
(52) U.S. Cl. ............................. 398/72; 398/68
(58) Field of Classification Search ............... 398/68–72
See application file for complete search history.

(56) References Cited

U.S. PATENT DOCUMENTS 7,734,179 B1 * 6/2010 Darcie et al. ..................... 398/72
2009/0080881 A1 * 3/2009 Yokoyama ....................... 398/16
2009/0080885 A1 * 3/2009 Mehrotra et al. ................. 398/48
2012/0069755 A1 * 3/2012 Li et al. .......................... 370/252

* cited by examiner

*Primary Examiner* — Leslie Pascal
(74) *Attorney, Agent, or Firm* — John R. Ross; John R. Ross, III

(57) ABSTRACT

A data center network comprising with an all-optical core network which includes a number of separate all-optical networks to connect clusters of computer network equipment at network nodes. Circuit modules in the data center network each includes a memory bank to provide queues to store information scheduled to be transmitted optically through the all-optical core network. Each circuit module also includes a lambda port module which includes a number of optical mux-demux units and an equal number of lambda ports designed to provide communication between the mux-demux units and the memory bank via a number of optical transceivers. In preferred embodiments all logic communication circuits through the core network are all optical fibers. The present invention creates non-interfering circuits by means of their spectral, spatial and temporal separation from each other.

7 Claims, 12 Drawing Sheets

ALL-OPTICAL DATA CENTER NETWORK

FIELD OF INVENTION

This invention relates to data networks and in particular to data center networks.

BACKGROUND OF THE INVENTION

Behind most online activities engaged in today are large groups of computers closely networked together at facilities commonly referred to as data centers. Whether it is search engines operated by large Internet search engine companies such as Google, online social networking sites such as Facebook or online retailer such as Amazon.com, behind all of their online services are large data centers often consisting of tens of thousands of computers interconnected by means of hundreds of networking components. As new online applications and services grow, the ubiquity, size, complexity and cost of such data centers will continue to grow.

Typical network architecture for data includes of routers and/or switches interconnected in a hierarchical manner using a tree like topology. Computers are typically connected to lower-end switches (edge switches) at the leaves of the network tree by means of 1 Gbps Ethernet interfaces. Closer to the roots of the tree where data traffic get aggregated, higher performance switches with higher data rate interfaces (10 Gbps or more) are deployed. Although most data centers today are constructed using similar scheme, they suffer form the following fundamental limitations, as discussed by M. Al-Fares, A. Loukissas and A. Vandat. A Scalable in *Commodity Data Center Network Architecture, SIGCOMM '08*, Aug. 17-22, 2008.

Electrical Power for a 20,000 Server Data Center

One of the limitations of such data center is the large amount of electrical power needed to operate a data center. In order to understand the electrical power needs, particularly those of a data center network, the reader could consider a typical data center using today's state of the art technologies. It consists of data switches, often referred to as edge switches, each with a number of ports where servers are connected. Each edge switch typically consists of at 50 or so ports, each operating at 1 Gbps. A data center with about 20,000 servers (computers) would require about 400 edge switches. Data from number of edge switches is aggregated using a higher performance aggregation switches. At peak utilization, each edge switches receives about 50 Gbps total traffic from 50 servers attached to it. Each edge switch has five 10 Gbps Ethernet connections, each connecting it to an aggregation switch. Each such aggregation switch typically consists of 48 ports operating at 10 Gbps. Therefore, aggregating data traffic from 400 edge switches would require about 35 aggregation switches. Since 10 Gbps is currently the economical limit of Ethernet standard, aggregation switches are further connected to a number of core switches using 10 Gbps Ethernet connections in order to switch traffic among aggregate switches. In order to maximize the network throughput, the network requires 35 or more core switches, each connected to an aggregation switch by means of 10 Gbps Ethernet connections. Therefore, a data center with as many as 20K servers would require about 400 edge switches and 70 high-end switches. A typical edge switch described here consumes about 104 Watts of power (e.g. HP ProCurve 2910al-48G Switch) and a typical aggregation/core switch consumes about 11.5 kWatts of power (e.g Brocade Biglron RX-35). Therefore, with today's state of the art technology, the average power consumed by the networking equipment alone at each data center is about 850 kilowatts, a large majority of which, about 800 kilowatts, is consumed by the core and aggregation switches.

Scalability

Another limitation of date center networks is their scalability. In the example of 20K-computer data center illustrated earlier, all computers are connected to Ethernet switches by means of 1 Gbps of connection. However, the average throughput that can be achieved by each computer is less than 1 Gbps. In data center terminology, an oversubscription ratio describes the radio of the worse-case achievable aggregate bandwidth among the end computers to the total bisectional bandwidth of a particular communication topology. An oversubscription radio of 1:1 mean that the network has enough capacity to allow for all computers to utilize their network interfaces at 100% of it peak capacity. According to [1], typical data centers are designed with oversubscription of about 2.5:1 (meaning, each computer connected to the network by means of a 1 Gbps interface can, in average, achieve only 400 Mbps of throughput). The 20,000 server data center example network described above has oversubscription of about 1.7:1. As stated in [1], event with today's technologies, achieving oversubscription of 1:1 in a data center with more that a few tens of thousands of servers is very challenging and often cost prohibited. Such scalability limitation is due to the capacity limitation at the core of today's state of the art data center networks.

Cost of Data Centers

The third limitation of modern datacenters is their cost, particularly the cost of the networking equipment that interconnects all the computers in a data center. As discussed in the example above, a typical datacenter with about 20,000 servers would need about 70 aggregation switches, each with 128 ports operating at 10 Gbps each. The cost of each such high-end switch is estimates to be more than $0.5 million. Therefore, the total cost of high-end switches needed to build a 20,000 computer data center is roughly about $35 million. In fact, the cost of the networking equipment of a high performance data center is often more than that of its servers. One of the limitations of modern data centers emanate from their use of packet switching technologies. Over the past several years, packet switched networks have become so pervasive that they have replaced virtually all other types of networking functions in all aspect of our lives. An alternate to a packet switched network is a circuit switched networks.

Circuit Switching

One of the downsides of circuit switches network had been its inefficiency in terms of its utilization. For example, when a circuit is established between two communicating parties, the bandwidth and network capacity of the network is reserved and dedicated for that purpose and that purpose only. Even though the communicating parties may not use the bandwidth, no one else is allowed to use the circuit and its bandwidth. This results in an inherent inefficiency of circuits if the circuits are not fully utilized by the two parties. One of the benefits of circuit switches are their simplicity. Once a circuit is setup in the beginning, the circuit remains in place and no additional operation is needed. Such simplicity often means much less processing of the signal or data as it traverses the network, resulting in simpler operation and lower power consumption.

Circuit switching gave way to packet switching primarily because of pervasive nature of digital communication and because of better bandwidth utilization efficiency of packet switching network, especially in presence of larger number of users. For example if the peak capacity needs of users of a network at any given time is less than the total capacity of a network, a circuit switching scheme adequately meet the need of the network. However, as the number of users of the network increases, packet switching network becomes more appropriate for such networks.

In all the discussions about packet switching network and circuit switched network, it often becomes apparent that the underlying reason for using packet switch network is for better utilization of the network capacity. However, a downside of a packet switching network is the amount of the processing that needs to be performed at each stage of the network. In packet switch networks, data packets contain specific information about the source and the destination of the packet. As the data packet makes its way from the source to the destination, it is periodically inspected by intermediate equipment in trying to make a decision about its route. Throughout the network, networking equipment inspect the packet and make a decision about the direction in which the packet is to be forwarded. Such processes have two shortcomings, as described below.

First, the intermediate networking equipment needs to perform significant amount of operation as its makes its decision. The operation often consists of steps to identify the appropriate outgoing port to forward the packet. Such results are often very simple, such as "if packet is destined for A, forward it on port X". However, the need to make such decision for every packet by every component of networking equipment makes it highly inefficient and unscalable. For example, a typical Ethernet networking equipment consists of about 128 ports, each operating at 1 Gbps. With a typical Ethernet packet consists of about 12000 bits, each port of the switch receives about 80,000 packets per second. With a typical Ethernet switch consisting of 128 ports, a switch typically has to process about 10 million packets per second! Such intensive decision making process would have been justified if there were millions of unique decision outcomes in a network. However, in a very large data center with as many 20,000 servers, the vast amount of processing seems hardly justified. What make it even more unjustified is that such processing is performed on every single packet that is transported through the network, even though the end-to-end connectivity is relatively limited. Furthermore, each component of the networking equipment that the packet is transported through needs to perform the same function for processing of information. This amount of processing results in significant amount of power consumptions.

Second, packet-switching operation also means that as packet are transported through the network, they are stored and forwarded at each stage of the network Furthermore, it is always the case that packet forwarding cannot begin until the entire packet is received. This restriction is imposed by the need to perform data integrity test on each packet. Each storing and forwarding process consumes additional power. But, more importantly, this requirement for storing before forwarding also imposes inherent latency in the network as packets are forward through the network. For example, on a 1 Gbps port, a typical 1500-byte Ethernet packet experiences no less than 12 micro-seconds of store and forward latency at each stage. If the packet has to hop through 6 such switches, it can experience about 72 micro-seconds of latency. The latency, though small, can get accentuated if packets experience queuing delays at each hop along the way.

Latency

Queuing delays are phenomena that emanate form the underlying principle of packet switching technique. As stated before, packet switching networks are better suited for application for multiple users to dynamically share the network resources. However, if the total demand for bandwidth is more than the underlying bandwidth of the network, packet switched networks can experience congestion, resulting in latency of even data loss that can become unacceptable. In order to accommodate multiplexing of data packets from multiple users, packet switching equipment make use of queues to store data packet. When a packet arrives at a port of a switch, the equipment identifies a port over which the data packet is to be forward and queues the packet for transmission. If there already are other packets in the queue destined for transmission to this port, the new packet would have to wait until all other packets ahead in the queue are transmitted. If there are 100 data packets in the queue ahead of a new packet, the new packet would have to wait until all the 100 data packet are transmitted. Assuming a 10 Gbps outgoing port and 1500-byte Ethernet packet, the new packet would have to wait about 0.12 milliseconds. If there are six switches along the path of the data packet, all experiencing similar average congestion, the end-to-end latency would be about 0.72 milliseconds.

Jitter

One of the consequences of latencies experienced in packet switched network is their variability, also known as jitter. As the level of congestion in packet switching network fluctuates, the latency experienced by data packets also fluctuates significantly. For many applications, 0.72 milliseconds of latencies with some jitter may be acceptable. However for certain application such as data centers, such latencies are highly intolerable. Furthermore, for highly parallel processing applications, jitter experienced by packets in networks can have highly negative impact on the performance of such systems as delay in on one operation because of packet patency can put on hold completion of many other operations. In order to overcome such limitations that can be brought about by large latencies and jitter, packet switch networks implement complex intelligent functions to guarantee quality of services (QoS). However, all successful quality of service deliveries require that the underlying network behave within certain statistical bound, a limitation not too far from what is required for a circuit switched network. On the contrary, in circuit switched networks, such QoS parameters are inherent and guaranteed without needs for additional intelligence in the network. However, in a packet switched network, maintenance of such QoS require significant amount of intelligence and processing although delivery of such QoS cannot always be guaranteed.

Despite its shortcoming outlined above, packet switched networks have become ubiquitous because of their efficiency and flexibility. They became a popular means for networks with dynamic topologies, such as Local Area Networks (LAN) as well as the Internet. Their preeminence grew, as growing demands required efficient sharing of limited network resource among large number of users. Eventually, packet switching network technologies made its way to specialized applications such as data center and grid computing.

What is needed is a better communication network for data centers.

SUMMARY OF THE INVENTION

The present invention provides a data center network comprising with an all-optical core network which includes a number of separate all-optical networks. The data center network also includes a number of clusters of interconnected computer network equipment, each cluster includes a number of sets of data center equipment at a network node. The cluster also includes a circuit module having a memory bank to provide queues to store information scheduled to be transmitted to the nodes within the cluster and queues to store information scheduled to be processed within the circuit module. Circuit modules also include a number of optical transceivers. Each circuit module also includes a lambda port module which includes a number of optical mux-demux units in communication with the memory bank via one of the optical transceivers. Each circuit module also includes a number of optical couplers and a number of optical waveguides to connect the optical couplers with the mux-demux units. Also included in the circuit module are a number of optical phi-ports to provide communication between the circuit module and each of the all-optical networks in the all-optical core network and a circuit module controller. The network also includes a number of optical waveguides connecting every phi port of each circuit module with the phi port of every other circuit module in the data center and a network controller to control via the circuit module controllers, the memory bank and the lambda port module in each circuit module in the data center network to create logic communication circuits between any circuit module in the data center network and any other circuit module in the network.

In preferred embodiments all logic communication circuits through the core network are all optical fibers. Preferred embodiments utilize frequency multiplexing and time multiplexing. The present invention creates non-interfering circuits by means of their spectral, spatial and temporal separation from each other. Spectral separation of circuits is achieved by making use of different optical wavelengths (spectrum), spatial separation is achieved by using physically different fiber optic network and temporal separation is achieved by means of controlling data transmission time (time-slots). By combining the three independent mutually orthogonal basis sets of spectral, spatial and temporal components, we achieve a method of creating in a three-dimensional space of the basis set. Advantages of the present invention include a huge reduction in electric power required to operate the data center network and a huge reduction in cost of equipment resulting from better use of available bandwidth.

DETAILED DESCRIPTION OF THE PREFERRED EMBODIMENT

In present inventions provide methods and apparatus for data center networks that are based on all optical circuits at the core of each data center network and packet aggregation and mapping at the edge.

Figure 1:
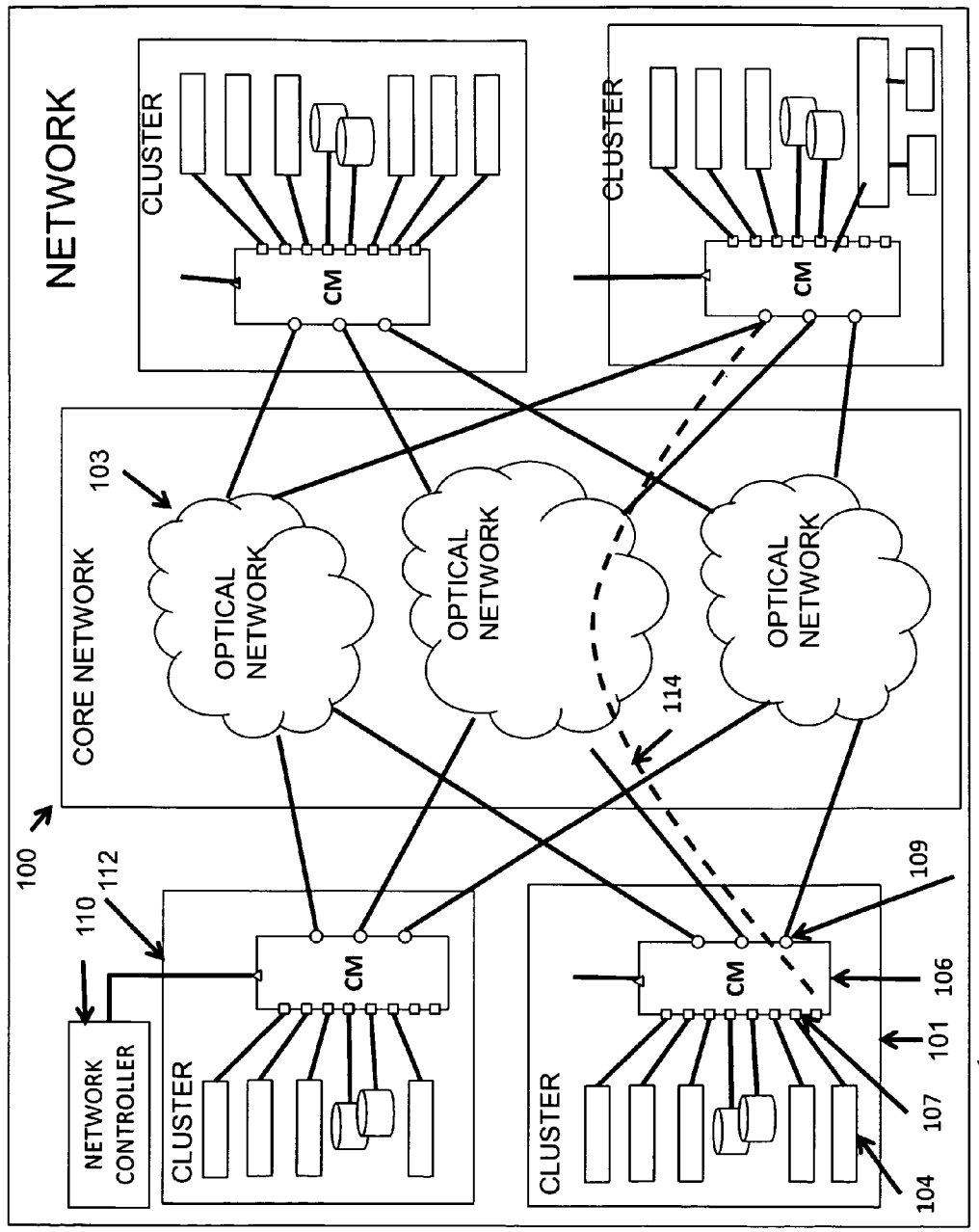
FIG. 1 is a drawing showing the preferred embodiment of the network architecture of the present invention.

The high level diagram of a preferred network architecture is described in FIG. 1. It is comprised of a core network 100 interconnecting a number clusters 101. The core network 100 comprises three optical networks 103. A detail description of the preferred core network 100 and optical network 103 is described later in this document. The network also consists of a network controller 110 that is responsible for managing the operation of and monitoring the entire network.

Network Clusters

A cluster 101 comprises of a set of equipment, including a circuit-module 106. A cluster 101 also comprises of other computing equipment that are typically used in a datacenter, labeled as nodes 104 in FIG. 1. A node may be a server, a network storage device, a switch, a router or any other device that connects to a data network. A cluster may be a heterogeneous (meaning it comprises of different types of nodes) or homogeneous (meaning it comprises of identical nodes). The number of nodes in a cluster may vary from one cluster to another. If a node in a cluster is a switch or a router, such switch or a router may also be connected to another network, such as the Internet. Furthermore, other nodes may be connected to such switch or router.

In each cluster 101, nodes 104 that are directly connected to a circuit-module 106 are connected through the circuit-module's legacy network interface 107. Legacy network interfaces 107 are network interfaces that make use of standard networking protocol such as Gigabit Ethernet. Use of industry standard legacy network interfaces enables use of commercially available nodes in the proposed network without having to modify their network interfaces. Circuit-module 106 also comprises one or more fiber optics interfaces referred to as optical-space interface 109. Each of the tree optical network 103 of the core network 100 is connected to each of the circuit-modules 106 through one of optical-space interfaces 109 of the circuit module. In this preferred embodiment, no optical-space interface 109 of a circuit-module is connected to more than one optical network 103.

Circuit Module

Figure 2:
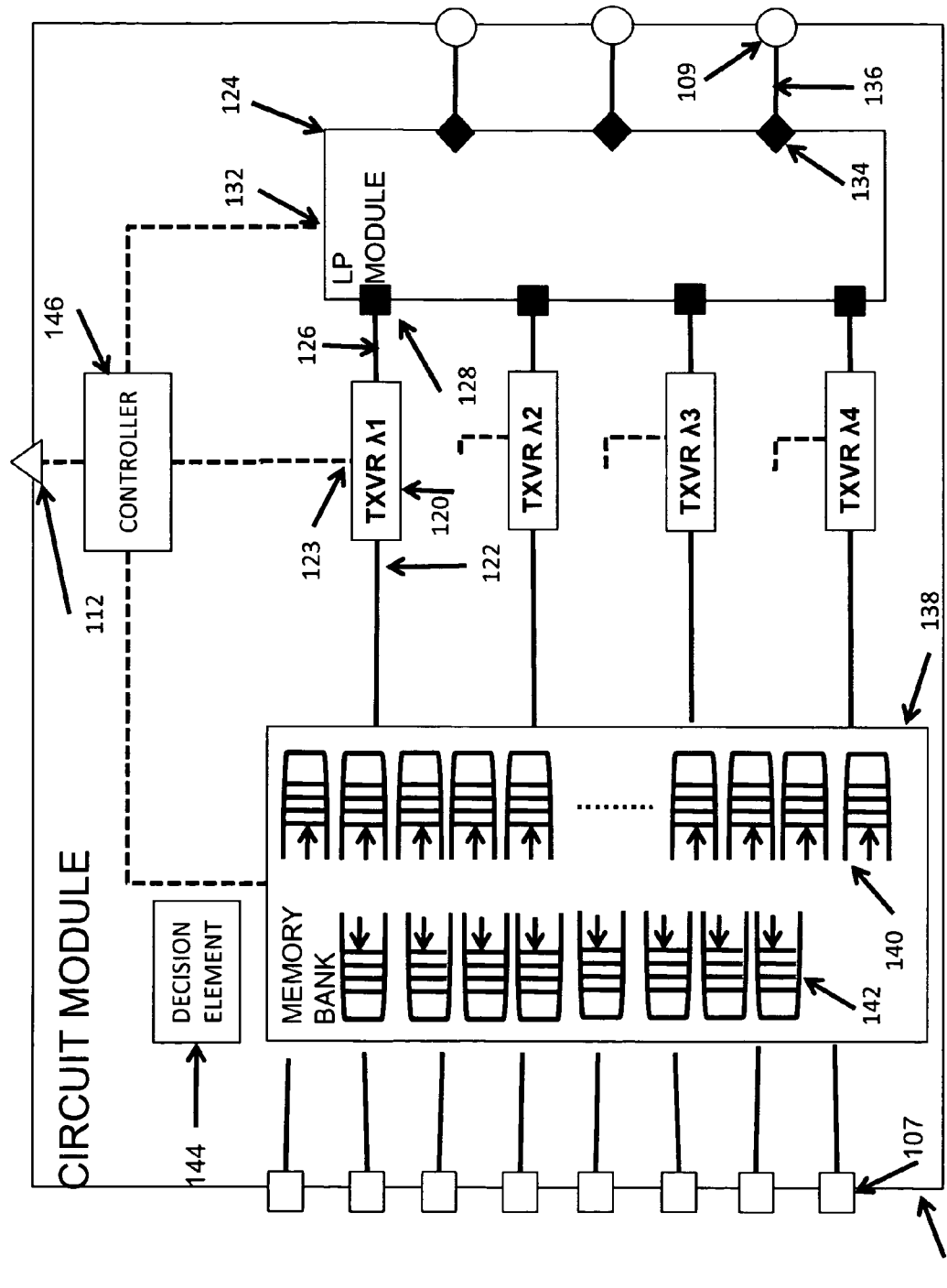
FIG. 2 shows the preferred embodiment of a circuit module.

A preferred circuit-module is outlines in FIG. 2. A circuit module 106 comprises of a number of distinct of optical transceivers (labeled TXVR) 120, each optical transceiver is transmitting and receiving optical signal using a specific wavelength at any given time. In the preferred embodiment, each optical transceiver 120 may be a commercially available fiber optics transceiver, each transmitting and receiving signal using a fixed wavelength, such as DQDM SFP with APD Receiver (Part Number FWLF1631xx) by Finisar Corporation. Optical transceivers 120 may also be a state-of the art fiber transceiver with tunable wavelength, such as SFF 10 GB/s Transponder (Part Number 16TRAAU4MALCB) by Finisar Corporation. When such a transceiver is used, the wavelength of transmission and reception of each transceiver may be changed over time.

Transceivers of the types identified above transmit and receive signals using different fiber optic interfaces. For such transceivers, the two signals are combined by coupling the two fiber optics interfaces using commercially available fiber couplers, such as such as the 815 series Single Mode Monolithic Fused Coupler available from Alliance Fiber Optics Products, Inc. Alternately, the transceiver may transmit and receive signal on the same fiber optical interface (such as DM80-01-¾ by Finisar) obviating the need for such fiber coupling.

Each transceiver of the type identified above may require use of a common wavelength to transmit and receive data. Use of a common wavelength requires that transmit and receive operations of each transceiver needs to be coordinated with each other in order to avoid interference with each other. This can be achieved by using time division multiplexing (TDM) technique whereby transmit and receive operations take place at two different times. Each optical transceiver 120 may also use different wavelengths to transmit and receive data. This is particularly the case when the wavelengths are independently tunable. In such a case, a transceiver may transmit and receive data simultaneously using different wavelengths. Each transceiver receives data to be transmitted in digital form from memory bank 138 over its electrical data interface 122. Similarly, each optical transceiver sends data it receives to memory bank 138 over its electrical data interface 122.

Each optical transceiver 120 is connected to a LP-module 124 by means of an optical waveguide 126 (such as a fiber optic cable). Other forms of optical waveguides may be substituted for the fiber optic cable. Each fiber optic cable connecting optical transceiver 120 to a LP-module 124 is connected to a lambda-port 128 of LP-module 124. LP-module 124 is controlled by controller 146 through its control port 132. Each optical-interface 109 of circuit module 106 is connected to a phi-port 134 of LP-module by means of fiber optic connection 136 and through interface 109. Circuit module 106 is connected to the three optical networks 103 of the core network 100.

Each circuit module 106 comprises a memory bank 138 where all data received by the circuit module 106 for transmission is stored. Memory bank 138 is organized in the form of data queues. Each queue can be implemented in the form of a dynamically connected linked-list of a set of memory elements, with each set consisting of sufficient memory elements to store data and control information associated with the data-packet. There are two different types of data queues, circuit-queues 140 and port-queues 142 as shown in FIG. 2.

Port queues 142 are used to queue data packets awaiting transmission over one of legacy network interface 107. Each legacy network port interface 107 has a set of one or more port-queues 142 associated with it where data packets awaiting transmission through the legacy network port interface 107 are queued. A port queue 142 is associated with only one legacy network port interface 107. Therefore, each circuit module 106 has at least as many port-queues 142 as there are legacy network interfaces 107.

Circuit-queues 140 are used to queue data packets awaiting transmission over of one circuit module's optical-space interface 109 to one of the three optical networks 103. As described later, data transmission over optical-space interfaces 109 occur in the context of logical entities called logic circuits. Each such circuit has one or more unique circuit-queues 140 associated with it, described later in this document. Each circuit-queue 140 is associated with no more than one logica circuit. Therefore, each circuit module 106 has at least as many circuit-queues 140 as there are logic circuits associated with it.

Circuit module 106 also comprises of decision element 144 that is responsible for making queuing decision on data packets received by circuit modules and await their transmission. In particular, a decision element 144 is responsible for identifying the appropriate queue for data packets and queuing the data packets in the identified queue for transmission.

Circuit modules 106 also consist of controller 146. The controller 146 is responsible for coordinating data transmission over optical-space interfaces 109. In particular, controller 146 is responsible for the control of LP-module 124, transceivers 120 and circuit-queues 140 to coordinate transmission of data via optical-space interfaces 109. Controller 146 communicates with network controller 110 as shown in FIG. 1 through circuit module's control interface 112. Controller 146 also schedules transmission of data from port queues 142 over network interface ports 107.

Lambda Phi Modules

Figure 3:
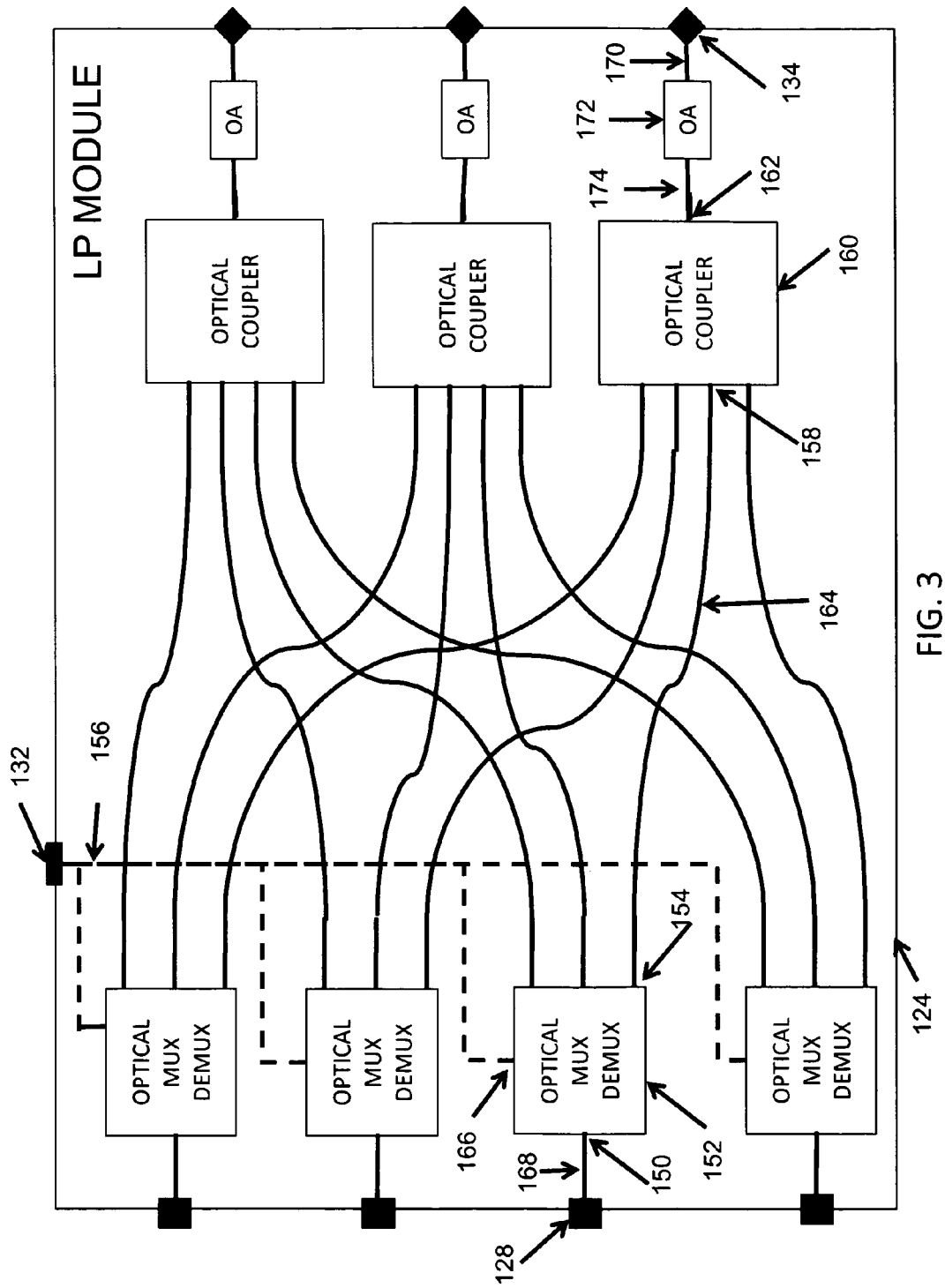
FIG. 3 shows the preferred embodiment of an LP module.

An LP Module 124 is illustrated in FIG. 3. The LP-module 124 comprises of a number of lambda-ports 128 and a number of phi-ports 134. A LP-module also comprises of a number of optical mux-demux units 152. Each LP-module 124 contains as many optical mux-demux 152 as there are lambda-ports 128. Each lambda-port 128 is connected to a mux-in port 150 of a mux-demux unit 152 by means of an optical waveguide 168, such as fiber-optic cable. Each LP Module 124 also comprises of a number of optical couplers 160. Each LP Module 124 contains as many optical couplers 160 as there are phi-ports 134 for connections to the optical network (3 in this embodiment). Optical couplers 160 are commercially available fused-fiber optical couplers such as the 815-Series Single Mode Monolithic Fused Coupler available from Alliance Fiber Optics Products, Inc.

As illustrated in FIG. 3, mux-out ports 154 of an optical mux-demux 152 are connected with decoupled-ports 158 of optical couplers 160 by means of optical waveguide 164, such as fiber-optic cable. Each optical mux-demux unit 152 has as many mux-out port as there are optical couplers 160 (it may have more mux-out ports but such extra ports are considered non-existent for the purpose of this description) and each mux-out port 154 is connected to decoupled-port 162 of the three (in the embodiment) optical couplers 160 by means of an optical waveguide 164. No more than one mux-port 154 of an optical-mux-demux 152 is connected to the same optical coupler 160. Each optical coupler 160 has at least as many decoupled port 158 as there are optical mux-demuxes 152 in an LP module 124 (four in this embodiment, it may have more decoupled ports but such extra ports are considered non-existent for the purpose of this description). As described above, each decoupled port 158 of an optical coupler 160 is connected to a mux-out port 154 of an optical mux-demux 152 by means of an optical waveguide 164. No more than one decoupled port of an optical coupler 160 is connected to the same optical mux-demux. Each optical mux-demux unit 152 is controlled by controller 146 by means of control signals through its control interface 166 and interface 132. Control interface of each mux-demux 152 is connected to the control interface 132 of the LP module 124 by means of signal interface 156.

The lambda phi module 124 also comprises of a number of optical amplifiers (OA), 172. Such amplifiers are commercially available components such as Semiconductor Optical Amplifier (SOA) manufactured by Thorlabs (Part 3 BOA1007C). Each optical amplifier 172 connects coupled-port 162 of an optical coupler 160 with a phi-port 134 of LP module 124 by means of a pair of optical waveguides, 170 and 174. The purpose of the optical amplifier 172 is to amplify optical signals to compensate for their attenuation/loss as signals propagate through optical coupler 160, optical mux-demux 154 and the optical network 103.

Figure 4:
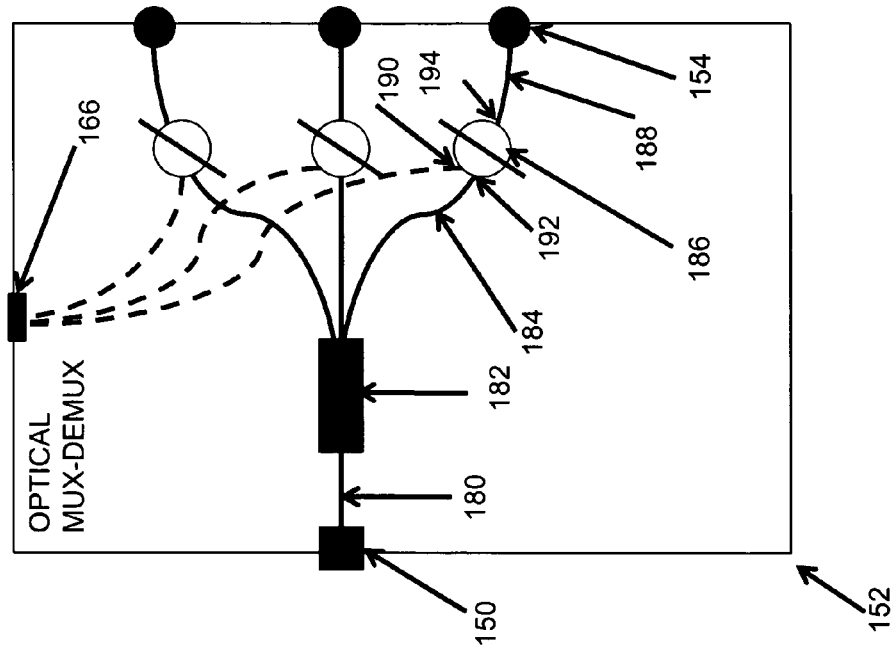
FIG. 4 shows the preferred embodiment of an optical mux-demux.

The optical mux-demux units 154 are preferably constructed using 1:N optical switch or a combination of fused fiber couplers and isolators. The preferred embodiment of optical mux-demux is described in FIG. 4. Its mux-in interface 150 is connected to a commercially available fused fiber coupler 182 (such as the 815 series Single Mode Monolithic Fused Coupler available from Alliance Fiber Optics Products, Inc.) by means of an optical waveguide 180, such as fiber optic cable. Fused fiber coupler 182 optically couples optical waveguide 180 with a number of other fiber optic cables 182, each of which is in turn connected to electrically controlled fiber optic isolator 186. Each optical isolator is constructed using commercially available optical isolators such as solid-state variable attenuators (NanoSpeed VoA) manufactured by Agiltron, Inc. Each isolator 186 is connected to mux-out ports 154 by means of an optical waveguide 188. Each isolator is controlled through its control interface 190, which is in turn controlled through control interface 166 of optical mux-demux 152.

Each optical isolator 186 can be activated or deactivated through its control interface 190. When interface 190 of an optical isolator 186 is activated, it optically isolates two sides of it, 192 and 194, by blocking optical signal from passing through it. Therefore, when attenuator 186 is activated, optical signal on fiber optics cable 184 is blocked from passing onto to optical fiber 188 and vice versa. When deactivated, the majority of optical signal from 184 will be pass through to 188 (and vice versa). Optical coupler 182 allows optical signal on one of its fiber ports, say 180, to be split among all other fiber connected to it, such as 184. Therefore, by selectively controlling control interface 166 of optical mux-demux 152, optical signal from mux-in port 150 can be transmitted to one of more of the mux-out ports 154 and vice versa. This function of mux-demux may be achieved by making use of optical switches or optical cross-connects.

The LP module 124 in each circuit module 106 allows a circuit module 106 to transmit optical signals generated by its optical transceivers 120 to one or more of any one of its optical-space interfaces 109. Similarly, it allows any one of the transceiver 120 to receive signal from any one of the optical-space interfaces 109 of the circuit module 106. These capabilities give a circuit module 106 an ability to transmit any one of its signals on any one of the optical-spaces connected to one of its optical-space interface 109 as well as an ability to receive signals from ay one of the optical-space interfaces 109 it is connected to. As discussed later, the ability to transmit optical signal and receive optical signals from any one of the optical-spaces is crucial in a circuit module's ability fully utilize logic circuits, discussed later.

Data Memory Banks

As discussed above, each circuit module 106 consists of data memory 138 where data packets are stored as they await their transmission. Circuit-queues 140 are used to queue data packets that are to be transmitted over a circuit module's (106) optical-space interfaces 109. Controller 146 controls transmissions of data packets that are queued in circuit-queue 140. In particular, based on information from network controller 110, controller 146 enables a circuit module 106 to transmit data packets, queued in a specific circuit-queue 140, at a specific time interval using a specific transceiver 120 over a specific optical-space interface 109. Similarly, based on information from network controller 110, controller 146 enables a circuit module 106 to receive data packets at a specific time interval using a specific transceiver 120 from a specific optical-space interface 109. As discussed below, these capabilities give a circuit module 106 ability to use, what are referred to as logic circuits, to transmit and receive data packets.

Network Logic Circuits

A logic circuit, depicted as dashed line 114 in FIG. 1 is logic entity created by network controls to interconnect two circuit modules 106 to enable communications between them. A logic circuit is a data transmission bandwidth resource for transmission of data from one circuit module to another circuit module. At any given time, a circuit interconnecting one circuit module 106 with another circuit module is distinct and unique from another circuit interconnecting it with yet another circuit module. More importantly, at any given time, two such unique logic circuits do not interfere with one another.

In preferred embodiments, Applicant uses a novel method of creating non-interfering circuits by means of their spectral, spatial and temporal separation from each other. Spectral separation of circuits is achieved by making use of different optical wavelengths (spectrum), spatial separation is achieved by using physically different fiber optic network and temporal separation is achieved by means of controlling data transmission time (time-slots). By combining the three independent mutually orthogonal basis sets of spectral, spatial and temporal components, we achieve a method of creating in a three-dimensional space of the basis set. Each circuit is represented by a vector is the three-dimensional space. Each circuit is represented in a circuit space by a vector $[\lambda_i, S_j, T_k]$, where $0 \leq i \leq W-1$; $0 \leq j \leq S-1$; $0 \leq k \leq T-1$ and W, S and T are the number of spectral, spatial and temporal components. W is the number of distinct wavelengths being used, S is the number of distinct optical networks being used and T is the number of distinct transmission time-slots (discussed below) being used. By using distinct W wavelengths, S distinct optical-spaces and T distinct transmission time-slots, as many as W*S*T independent and non-interfering circuits can be created to interconnect the circuit modules with each other in the network. For example, a circuit modules consisting of 4 optical transceivers (each using a distinct wavelength), 3 optical-space connections and 10 distinct data transmission times-slots can create as many as 120 circuits.

As described above, a circuit can be thought of a vector in a three-dimensional space, consisting of orthogonal spectral, spatial and temporal components. The spectral separation of circuits can be achieved by using different optical wavelengths that do not optically interfere with each other. For example, this can be achieved by fitting each circuit module 106 with optical transceiver (transmitter and receiver) 120 tuned to specific frequency. For example, a circuit module in FIG. 2 can be fitted with 4 optical transceivers, each operating at a different wavelength. Presence of W transceivers transmitting at distinct optical spectrum gives each circuit module access to W spectral components, a basis set for creating circuits.

The spatial separation of circuits can be created by using different and independent sets of optical fiber medium such that data transmission in one optical fiber cable is completely separated from the data transmission in another optical fiber cable. Such spatial separation is achieved by circuit module 106 by transmitting optical signal over different optical-space interfaces 109, each of which connects to a distinct optical network independent of each other. For example, the circuit module illustrated in FIG. 2 has three optical-space interfaces, allowing it to transmit and receive signal over any one of the three optical networks attached it optical-space interfaces.

Figure 5:
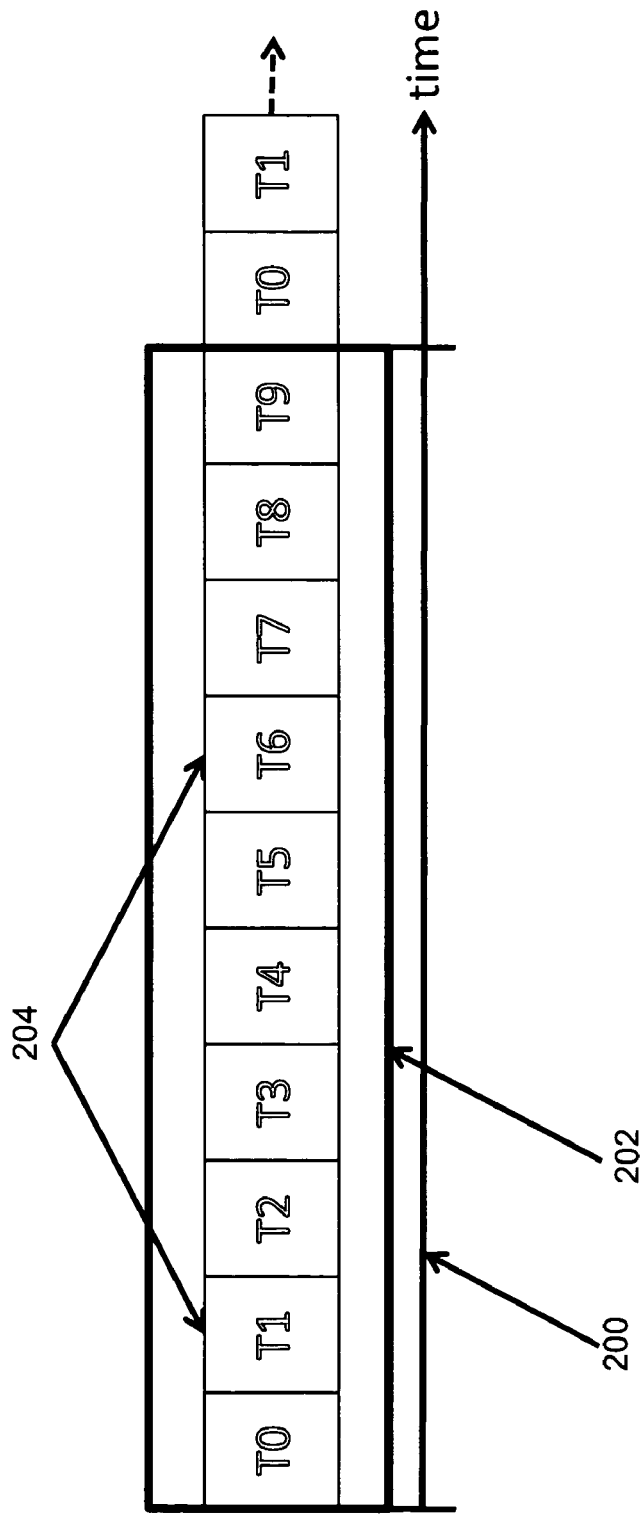
FIG. 5 illustrates temporal component in the form of time-slots.

The temporal separation of the circuits can be created by means of using distinct time for transmission of data. As illustrated in FIG. 5, each circuit module achieves temporal separation of circuits by dividing data transmission time 202 into periodic intervals called frames 202. Each time frame 202 is further divided into T number of sub-frames (or time-slots) 204, where T corresponds to the number of "temporal components" of the circuit space. Each time-slot 202 constitutes the temporal component of a circuit. For example, as illustrated in FIG. 5, there are as 10 time-slots within frame 202, labeled as T0 through T9. During each time-slot, data traffic that is supposed to be transmitted using the circuit that corresponds to the time-slot is transmitted. The temporal separation achieved by means of using time-slots can be implemented by imposing transmission scheduling of each packet at each circuit module 106. In each circuit module 106, controller 146 controls and schedules data transmissions and receptions. Controller 146 of all circuit modules 106 in a network 99 (FIG. 2) are synchronized with each other and controller by network controller 110 by means of their control interfaces 112. Such synchronization and control allows circuit modules to achieve precise coordinate of their transmission frames and time-slots.

The method described above enables creation of circuits that are independent of each other and can be used to allow circuit module to communicate with each other in pair. For example, a pair of circuit modules may communicate with each other using wavelength $\lambda_2$ and optical-space $S_1$ during time slot $T_1$ ($[\lambda_2, S_1, T_1]$ in vector representation), while another pair of circuit modules communicate with each other using $\lambda_1$ and optical-space $S_1$ during time slot $T_1$ $[\lambda_1, S_1, T_1]$.

A described above, a circuit is uniquely identified by a combination of its spectral, spatial and temporal component $[\lambda_i, S_j, T_k]$. However, a circuit does not necessarily uniquely identify a pair of circuit modules it interconnects. In other words, a circuit $[\lambda_1, S_1, T_1]$ used to interconnect a pair of circuit modules at any given time may be used to interconnect another pair of circuit modules at a different time. Similarly, more than one circuit may interconnect a pair of circuit modules at any given time.

As discussed above, a datacenter network 99 making use of W spectral components, S spatial components and T temporal components, can have as many as W*S*T circuits. At any given time-frame T1, as many W*S circuits may be used to interconnect circuit modules. Since each circuit interconnects two circuit modules, as many as 2*W*S circuit modules may be interconnected at any give time-slot. For example, a network 99 with three spatial components defined by the optical networks 103 may simultaneously interconnect as may as 24 circuit modules 106 that make use of four spectral components defined by the optical mux-demux units 152.

If a network 99 has N number of circuit modules, the number of circuits needed to interconnect each circuit module 106 with every other circuit module is given by N*(N−1)/2 (it is assumed, without loss of generality, that each circuit can support bi-directional data traffic). For example, a network with 300 circuit modules would need a total of 300*299/2=44850 circuits to interconnect all circuit modules. However, each circuit module needs to interconnect with 299 other circuit modules, requiring each circuit module to have access to 299 circuits. Therefore, a network that makes use of W spectral components and S spatial components would need ⌈N*(N−1)/(2*W*S)⌉ time slots (temporal components) in order to achieve communications among all circuit modules (⌈ ⌉ designates a rounding up operation.)

Circuit Queue and Scheduling

As discussed before and outlined in FIG. 2, data packets awaiting transmission over optical-space interfaces 109 are stored in memory 138 and queued for transmission in circuit queues 140. Each circuit module 106 has at least as many circuit queues 140 as it needs circuit connecting it to other circuit modules. In other words, for each circuit 114 that connects a circuit module 106 with another circuit module, there is at least one unique circuit queue 140 associated with it. Therefore, in a network 99 with N circuit modules, each circuit module 106 has at least (N−1) circuit queues. Therefore, at any given time, for every circuit $[\lambda_i, S_j, T_k]$, there is a circuit queue 140 associated with it in exactly two circuit modules. We designate the circuit queue in circuit module N associated with circuit $[\lambda_i, S_j, T_k]$ as $Q_{[N,i,j,k]}$.

Each circuit module 106 keeps track of the time to keep track of temporal component of circuits. During each time-slot (temporal component) $T_k$, controller 146 within circuit modules N enables transmission of data packets from circuit queues $Q_{[N,i,j,k]}$ corresponding to temporal component $T_k$. Data packet get transmitted in the order they are queued in each queue (the packet from the head of the queue being transmitted first). If the queue has no data packet in it, no data gets transmitted and the circuit remains unused during time slot $T_k$. If the queue has more data than what can be transmitted during a single time slot, the remainder of the data is left in the queue for transmission during the next scheduling of circuit $[\lambda_i, S_j, T_k]$. For example, let us assume that a circuit module N may have two circuit queues, $Q_{[N,1,1,5]}$ and $Q_{[N,2,1,5]}$ associated with it. Let us further assume that $Q_{[N,1,1,5]}$ has 5 packet to be transmitted using circuit $[\lambda_1, S_1, T_5]$ and $Q_{[N,2,1,5]}$ has 100 packets to be transmitted using circuit $[\lambda_2, S_1, T_5]$. If each time-slot is sufficient to transmit 50 packets, transmission on circuit $[\lambda_1, S_1, T_5]$ would stop after transmitting all 5 packet in queue $Q_{[N,1,1,5]}$ while transmission on circuit $[\lambda_2, S_1, T_5]$ would continue on until the end of time slot $T_5$ and at the end of time slot, $Q_{[N,2,1,5]}$ would have 50 data packets left in it.

As illustrated in FIG. 2, data packets awaiting for in a circuit module 106 transmission over legacy network interfaces 107 of a circuit module are stored in memory 138 and queued for transmission in port-queues 142. Data packets from port-queues 142 are transmitted using conventional method such as those implemented in commercially available Ethernet switches or routers.

Decision Element and Queuing Decision

As illustrated in FIG. 2, each circuit module 106 consists of a decision element 144. The primary function of a decision element 144 is to make forwarding decision on each data packet received by a circuit module over it legacy network interface 107 or optical-space interface 109. For each data packet received by a circuit module 106 that needs to be forwarded, a decision element 144 identifies a queue, either a port-queue 142 or a circuit queue 140, where the packet is to be queued and takes the necessary action to queue the packet in the identified queue. The queuing decision made by a decision element 144 is based on the header information received with each data packet. In this preferred embodiment, it is assumed that each data packet is formatted using IP (Internet Protocol) standard. Each data packet such formatted consists of 32-bit destination IP address, the IP address of the node the packet is destined to. IP address are written as A.B.C.D, where A, B, C and D each represent an 8-bit component of the address. Addresses are typically assigned in a hierarchical fashion often referred to as sub-netting.

Using this method, we assign the lowest level of address hierarchy to all the nodes 104 in a cluster 101. If each cluster has less than 254 nodes, we assign subnet address 10.0.N.0 to each cluster C and assign IP address 10.0.C.N to node N in cluster C. For example, node 12 attached to circuit module 5 is assigned IP address 10.0.5.12. Similarly, node 25 attached to circuit module 10 is assigned IP address 10.0.10.25. If there are more nodes per circuit module than 254, we may use sub-netting in the form of 10.C.0.0 to assign IP addresses to nodes in cluster C.

In each circuit module 106, decision element 144 maintains an association, (called subnet-to-circuit association) between a circuit and the IP-subnet address of the cluster that the circuit connects the circuit module with. For example, let us assume that circuit module CM1 is connected to circuit module CM2 in cluster C2 by means circuit by means of circuit $[\lambda_a, S_b, T_c]$. Let us further assume that cluster C2 is assigned IP subnet address of 10.0.2.0. Decision element 144 in CM1 maintains an association between circuit $[\lambda_a, S_b, T_c]$ and subnet address 10.0.2.0. Each time CM1 receives a data packet, it computes the destination subnet address of packet, identifies the circuit based subnet-to-circuit association, and queues the packet in the circuit-queue belonging to the circuit associated with the subnet address computed from the packet's destination IP address. For example, if CM1 received a packet with destination IP address of 10.0.2.5, it would compute the packet's destination subnet address by masking the one bytes of the address (which, in this case, would result in 10.0.2.0), identify appropriate circuit based on its subnet-to-circuit association (which, in this case, would result in $[\lambda_a, S_b, T_c]$) and queue the packet in circuit queue associated with circuit $[\lambda_a, S_b, T_c]$. If the IP-subnet address turns out to be the subnet address of the cluster the circuit module is in, the packet is queued in one of the port-queues of the circuit module based on the industry practice of packet switching and routing.

When another networking protocol is used, a similar scheme may be used to identify the proper circuit by each circuit module. For example, when Ethernet protocol is used, each circuit module would identify the proper circuit by inspecting the destination MAC address of the packet and locating a matching entry in a lookup table. It may build the lookup table by communicating with its counterpart circuit modules and associating circuits with MAC addresses of nodes attached to the counterpart circuit modules. It may also build the table with the help form the network controller 110. In either case, the act of identifying the proper circuit is as simple as searching through a lookup table. With today's technology capable of implementing complex hash function in hardware (routinely used in Ethernet switches), performing the lookup function can be done much faster than the time it takes to receive a packet.

Optical Network

Figure 6:
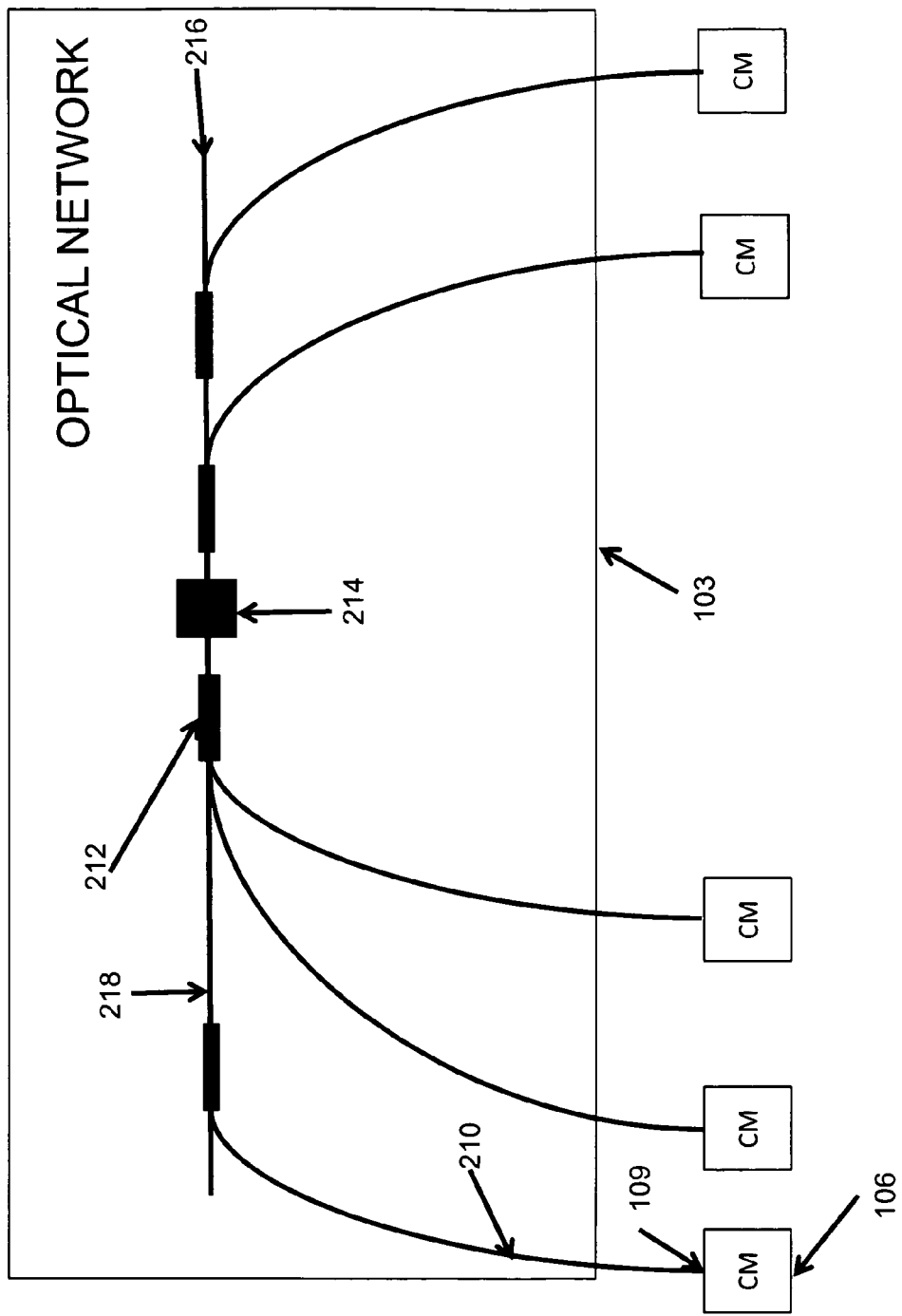
FIG. 6 shows a preferred embodiment of an optical network.

FIG. 6 illustrates features of an optical network 103. Each optical network 103 consists of an optical bus 216, which comprises of a series of fiber optic couplers 212 interconnected by fiber optic cable 218. Each fiber optic coupler 212 is also connected to an optical-space interface 109 of one or more circuit module 106 by means of a fiber optic cable 210. Each optical coupler 212 couple signal from a circuit module 106 onto optical bus 216 and vice versa. Optical network 103 may also include one or more optical amplifier 214 used for the purpose of amplifying optical signals in optical bus 216. Optical signals transmitted by a circuit module 106 over its optical-space interface 109 attached to network 103 is received by all other circuit modules that are also connected to optical network 103.

Core Network

The core network 100, outlined in FIG. 1, is a group of optical networks 103 (three in this case) that are physically connected to the same set (or subset) of circuit modules 106 but are optically isolated from each other. The optical isolation ensures that an optical signal in one optical network does not make it to another optical network in the same core network.

Dynamic Optical Sub-Network

One of the limitations of an optical network 103 as illustrated in FIG. 6 is that only one wavelength can be used in an optical space at any given time. Since an optical network 103 in essence a shared medium among all the circuit modules 106, all other circuit modules attached to network 103 receive all signals transmitted by circuit module 106. As a consequence, no more than two circuit modules 106 may communicate over an optical network 103 using the same wavelength at the same time. Described differently, an optical network 103 can support only one logic circuit, of a given wavelength at any given time. In the following section, we describe a method for overcoming such limitations.

Figure 7:
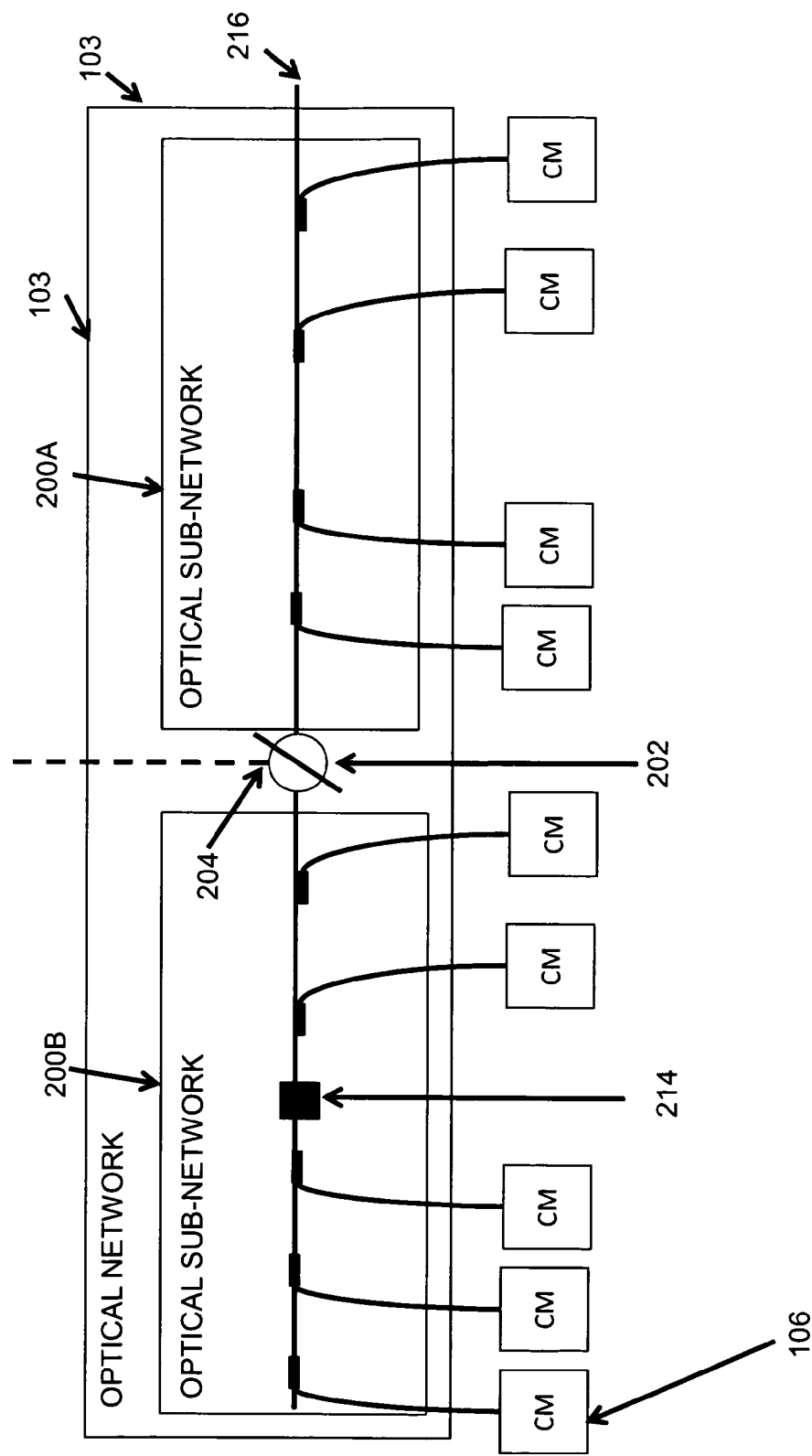
FIG. 7 illustrates creation of optical sub-networks.

We overcome the limitation described above by creating what are called dynamic optical sub-networks. As illustrated in FIG. 7, an electrically controlled optical isolator 202 is inserted in optical bus 216 such that optical network 103 is separated into two optical sub-networks, 200A and 200B. Commercially available optical isolator such as NanoSpeed VoA offered by Ariltron, Inc. may be used. The network controller 110 shown in FIG. 1 controls optical isolator 202 through its control interface 204. A sub-network (e.g., 200B) may include an optical amplifier 214 or may not include an optical amplifier (e.g., 200A). Number of circuit modules 106 in each sub-network may differ from each other.

When optical isolator is activated through its control interface 204, optical sub-network 200A becomes optically isolated from optical sub-network 200B. When they are isolated, optical signals in one optical sub-network 200A do not interfere with optical signal in optical sub-network 200B (and vice versa). When optical isolator 202 is inactive, optical signals in optical sub-network 200A will be able to propagate to optical sub-network 200B (and vice versa), allowing for circuit modules 106 in one sub-network to communicate with circuit modules in another sub-network.

By splitting each optical network 103 into two optical sub-networks, both the sub-networks can make use of the same set of optical wavelengths at the same time. During the time when an optical space is split into multiple spaces, no data traffic can be transported between the two sub-networks. However, during this time, all circuit modules 106 within optical sub-network 200A can communicate with each other using a set of wavelengths while circuit modules 106 within optical sub-network 200B are communicating with each other using the same set of wavelengths. Effectively, for duration of the isolation, we effectively increase the number of optical-spaces by a factor of two, doubling the total network capacity.

Figure 8:
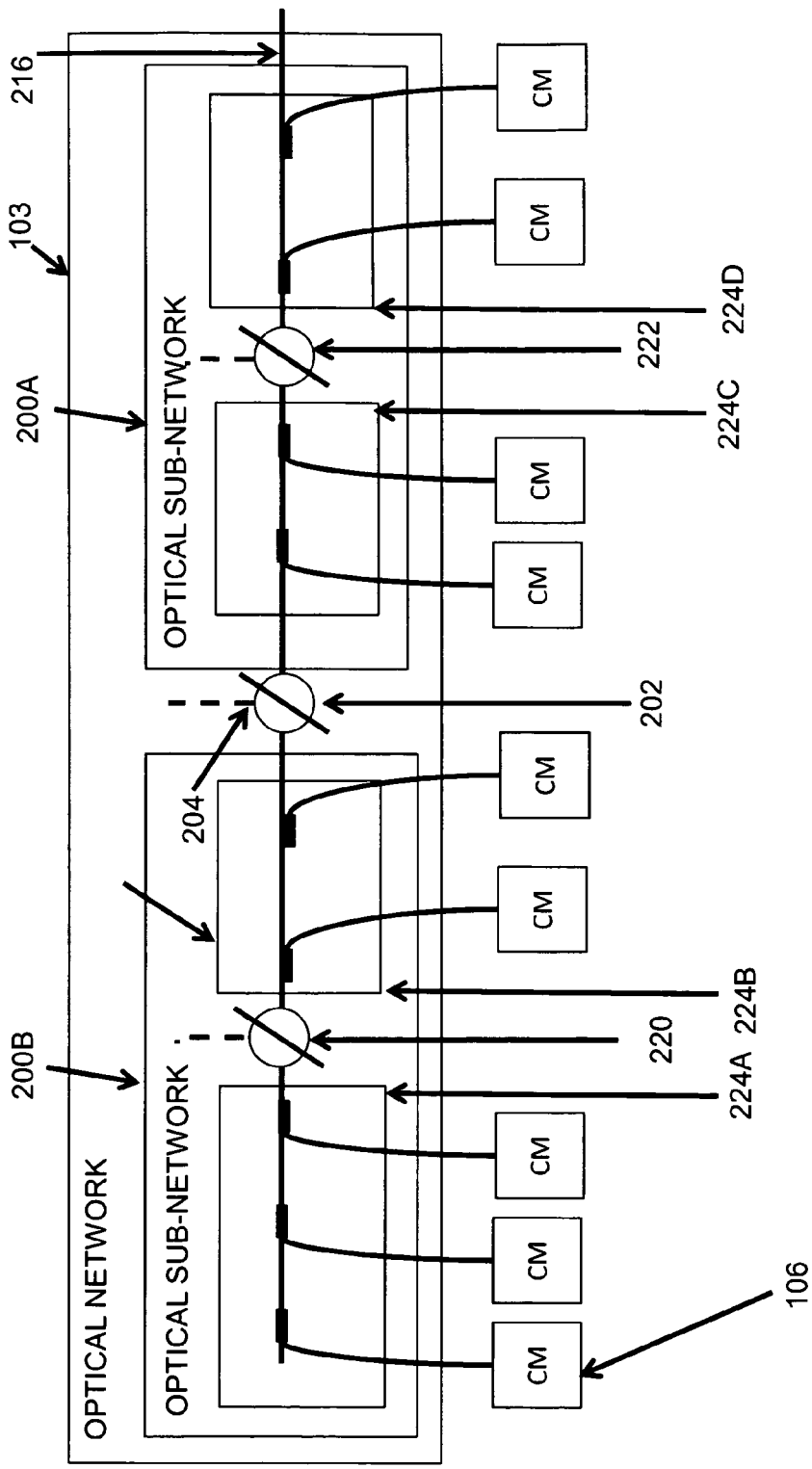
FIG. 8 illustrates further splitting of optical sub-networks to create smaller optical sub-networks.

The optical splitting illustrated in FIG. 7, can be implemented recursively by further splitting each sub-network, as illustrated in FIG. 8. In this case, optical isolator 220 divides sub-network 200B into two sub-networks, 224A and 224B. Optical isolator divides sub-network 200A into two sub-network 224C and 224D.

Figure 9:
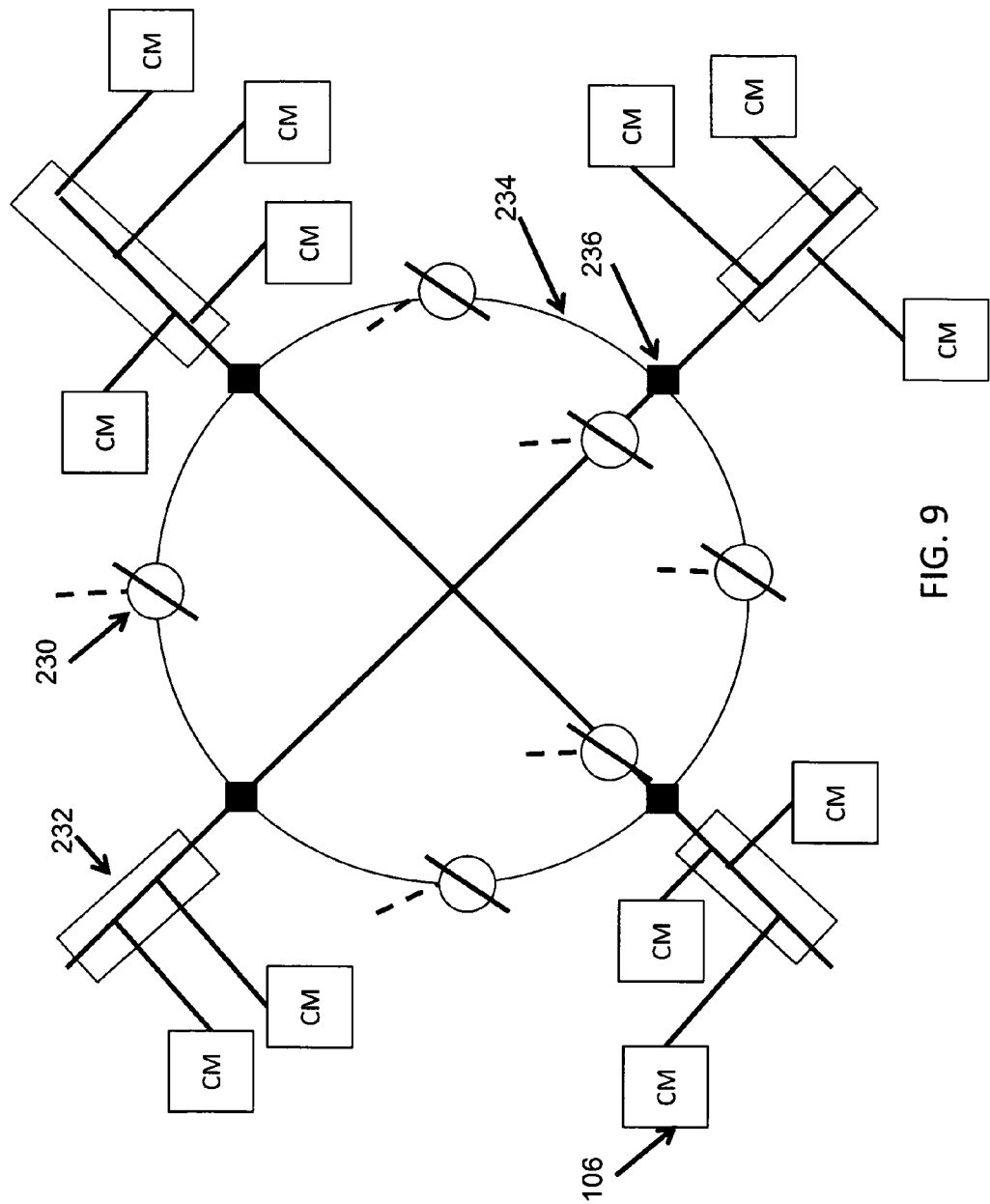
FIG. 9 illustrates an alternate method for creating optical sub-networks.

In FIG. 9, we illustrate yet another method of creating sub-networks that can make more efficient utilization of optical networks. In this case, the optical network is a combination of four smaller optical networks, 232, interconnected with each other by means of an optical ring network 234 and optical couplers 236. The network is divided into multiple segments by means of six electrically controller optical splitters 230 strategically located throughout the network. The splitters are activated such that at any given time, the network is split into two sub-networks, each consisting of 2 groups of circuit modules. Such sub-networks are created a total of three times to allow the circuit modules in four groups to communicate with each other. Finally, the network is split in to four groups enabling circuit modules in each group to communicate among themselves. With this method, the optical network utilization can be doubled.

Figure 10:
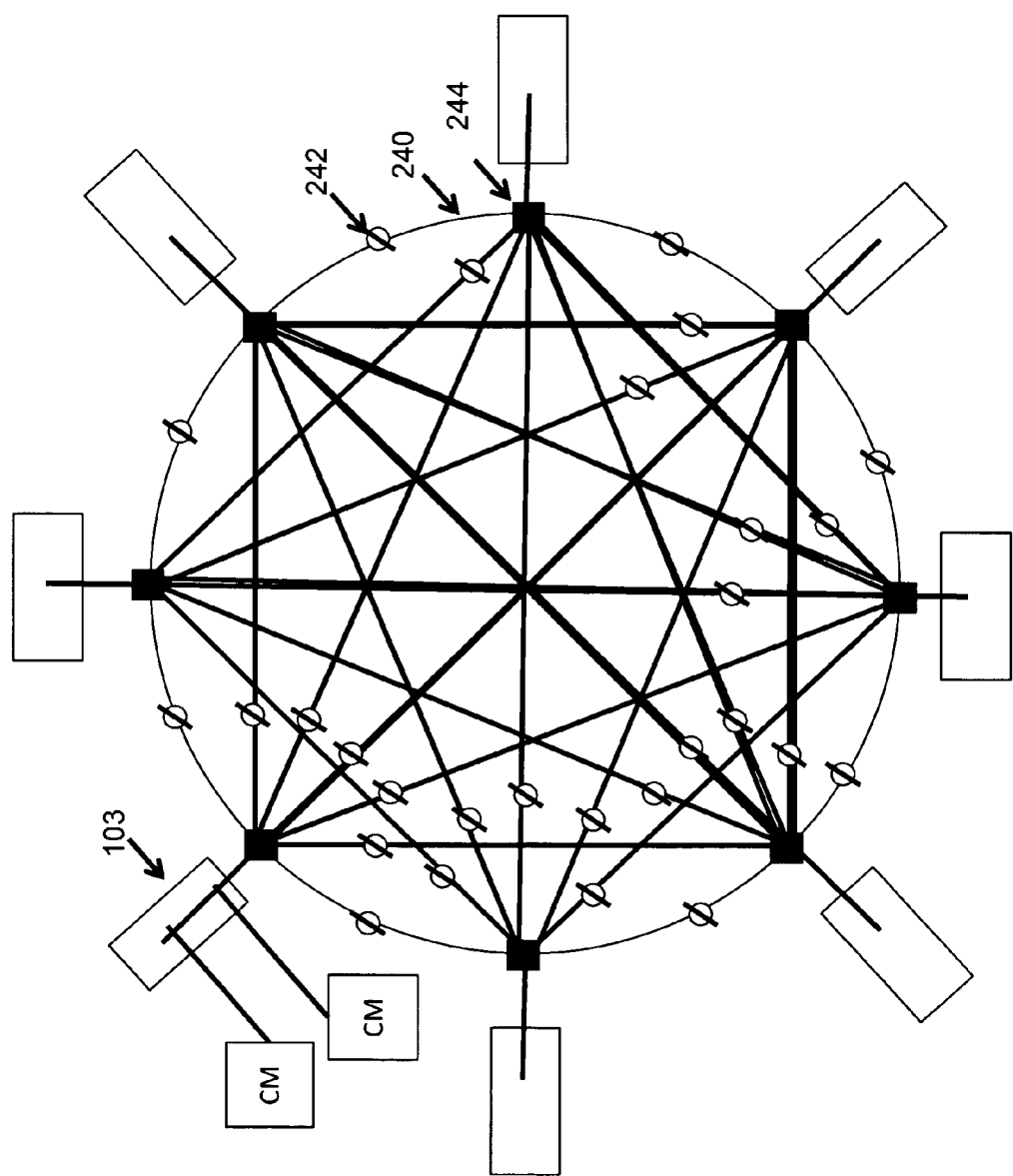
FIG. 10 illustrates creation sub-networks based on a complex network topology.

Another illustration of a technique for splitting optical network to create more granular sub-spaces is illustrated in FIG. 10. It consists of eight optical networks 103 interconnected a mesh of fiber optic cables 240 with optical couplers 244 and isolators 242. With such topologies, higher utilization of optical networks can be realized.

Optimized Spectrum Utilization

As stated earlier in reference to FIG. 2, since each circuit module 106 may be using any one of the circuits, it seems like each circuit module needs to have access to all components of all possible circuits. In other words, it seems like each circuit module needs to have access to all wavelengths, optical-spaces and sub-frames in order for it to be able to use any one of the circuits. To illustrate this example, let us consider a case of network with 300 circuit modules. With each circuit module connected to every other circuit module, there are as many as 300*299/2=44,850 unique circuits (assuming that each circuit is bi-directional). Since we do not have any a priori knowledge of how 44,850 circuits are assigned among pairs of circuit modules, it seems like each circuit module needs to have access to all the components of these circuits.

Designing a network with a large number of circuits such that a circuit module has access to all the circuits can be costly. In particular, if we were to use a large number of temporal components to achieve 44,850 logic circuits and gave each circuit module access to all the temporal components, the latency experience by data packets in each circuit module would be too large. If we were to use a large number of spatial components, the cost of LP couplers in each circuit module would be too high. Alternately, if we were to use a larger number of spectral components, each circuit module would need to use larger number of fiber transceiver, increasing the cost of circuit modules.

Although the total number of circuits in a network 99 is very large, we know that each circuit module needs only 299 of the 44,850 circuits (because it needs to connect with 299 other circuit modules). This means, a circuit module would not need to use all the components of the circuit space. Since a circuit module does not need to make use of all the circuits, it would be highly desirable to assign the circuits to circuit modules such that each circuit module would not need all the resources to access all circuit in the network. This is particularly so if the assignments of the circuits are fairly static. In the description below, we illustrate a novel method for making such assignments.

Figure 11:
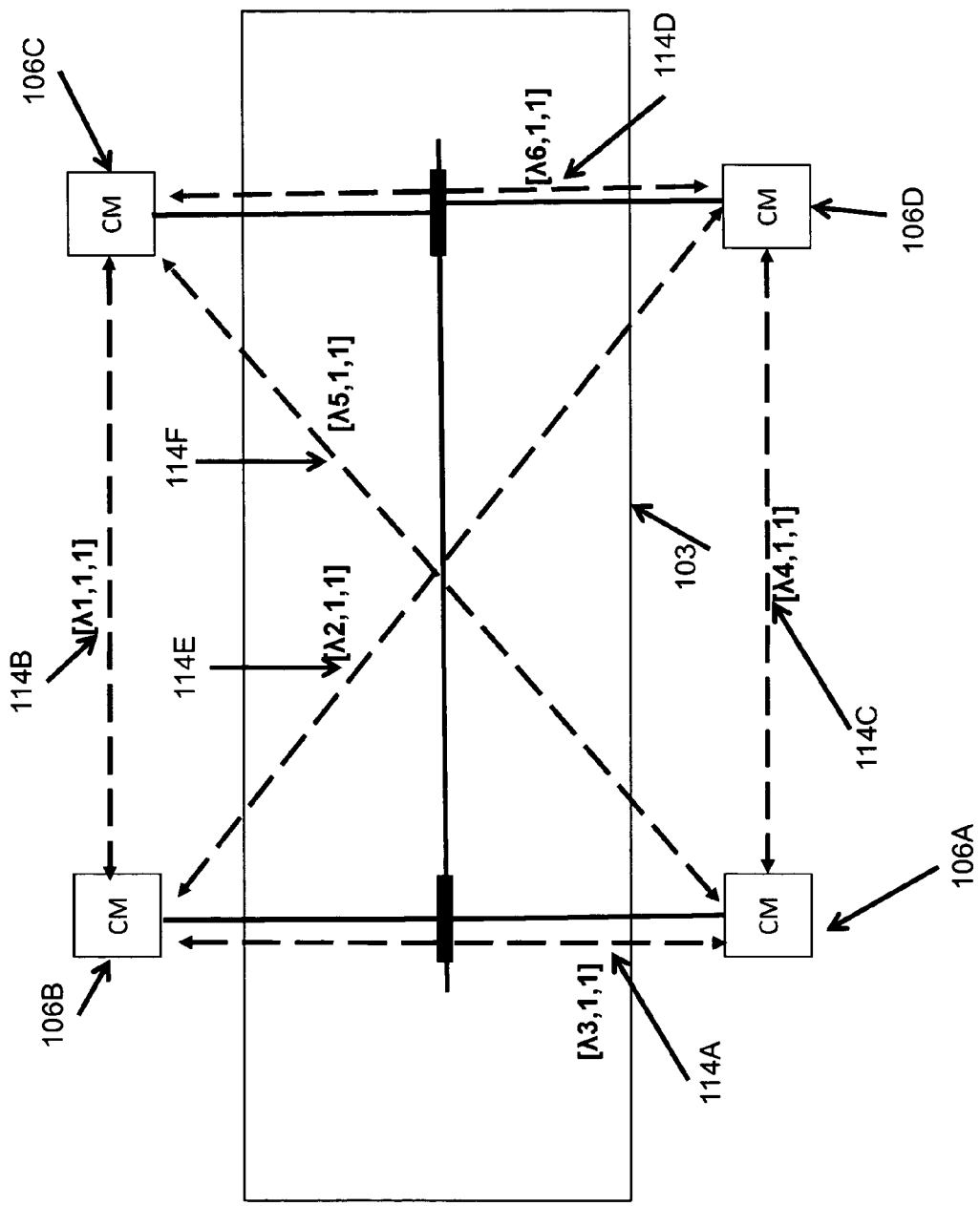
FIG. 11 illustrates efficient utilization of optical spectrum.

In order to illustrate this method, let us consider a simple example with four circuit modules, 106A, 106B, 106C and 106D, interconnected by one optical network, 103, as illustrated in FIG. 11. A complete connectivity among these circuit modules requires a total of 4*3/2=6 circuits (bi-directional circuits). Let us assume that our circuit space is composed of six spectral components (wavelengths $\lambda 1$ through $\lambda 2$), one spatial component (one optical network, 103) and one temporal component (one time-slot). The four circuit modules communicate with each other by means of six circuits, 114A through 114F, as illustrated in FIG. 11 dash lines. In this example, even though the network makes uses of all 6 $\lambda$s, each circuit module makes use of only three $\lambda$'s, potentially reducing the cost of each circuit module.

Let us consider a network with as many as 20 circuit modules. There are as many 190 circuits to interconnect these 20 circuit modules. For simplicity, let us again assume that our circuit space is composed of 190 spectral components ($\lambda$s), 1 spatial component (1 optical network) and 1 temporal component (time-slot). It can be shown that, using the method outlined above, circuit assignments can be made such that each circuit would need no more than 19 spectral components.

The significance of this method is very important when economics of the solution. In order to transmit and receive signal using one of the $\lambda$s, a circuit module needs a fiber transceiver operating at that $\lambda$. If a circuit modules were required to have access to all $\lambda$ at all times, it would need to 190 fiber transceivers, each operating at a different $\lambda$. However, with the technique described above, each circuit module would need only $1/10^{th}$ as many fiber transceivers. Fiber transceivers are usually available in modular form with standard electrical interfaces (such as SFP standards). With this technique, each circuit module would be designed accept 19 modular fiber transceiver (such as SFP transceiver). Once the spectral component of each one of the 19 ports of a circuit module is identified, a matching modular fiber transceiver is plugged into the interface, giving the circuit module access to the all the circuits is it assigned A similar technique may also be used to reduce the number of time slots instead of optical transceiver, if reduction in time slots were more desirable due to concerns about network latency.

In the discussions above, we illustrated methods for efficient utilization of optical spectrum and reduction in number of optical transceiver in each circuit module. In these discussions, it was assumed that the circuit space has only one temporal component (single time-slot). Spectral utilization can be improved significantly when a network allows for more than one temporal component. Below, we illustrate methods for further optimizing spectral use and reducing number of optical transceiver in each circuit module when a network allow for more than one temporal component.

Lambda-Group Method

Figure 12:
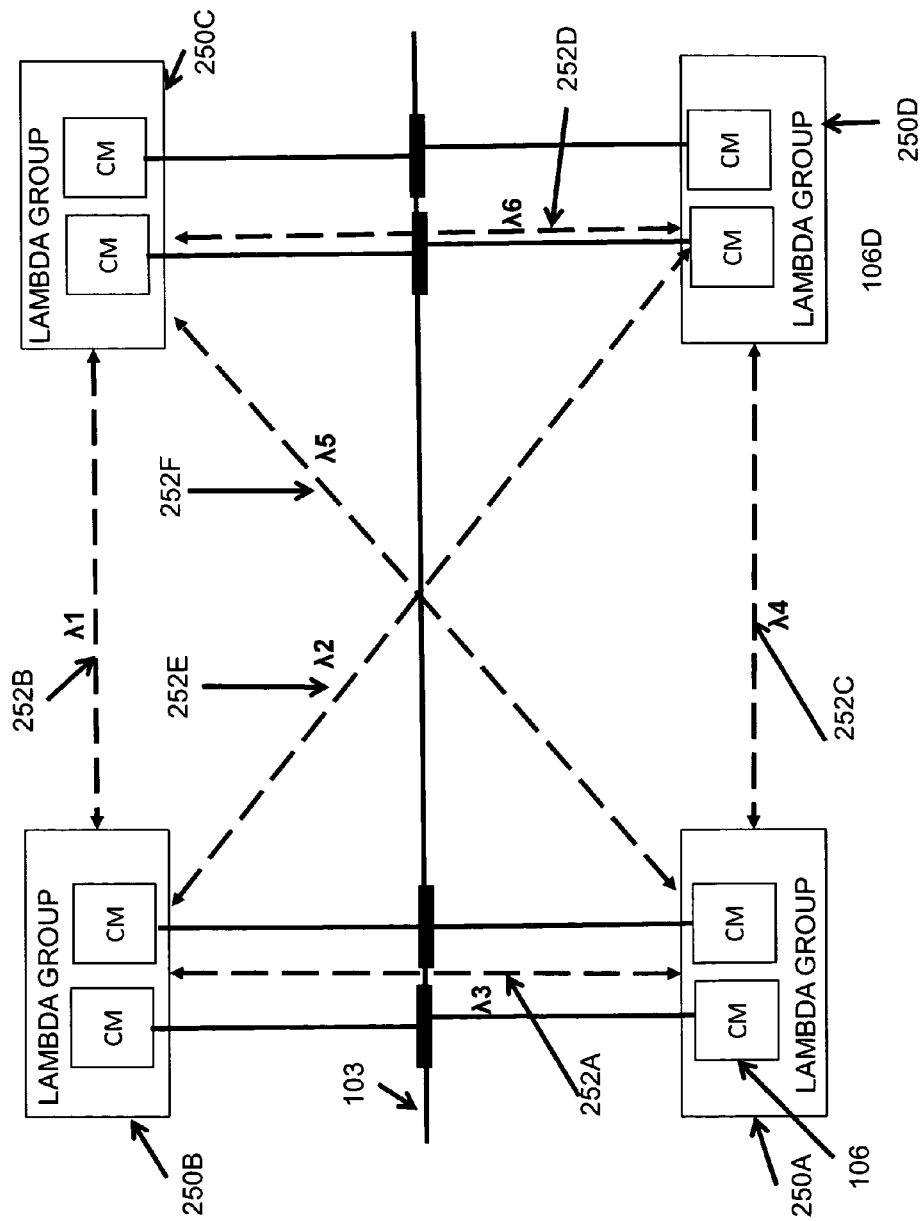
FIG. 12 illustrates efficient assignments of optical spectrum using lambda-group method.

One method for reducing required spectrum is referred to as a lambda-group method. A preferred embodiment of this method is illustrated in FIG. 12. The network consists of eight circuit modules 106 in groups of two, referred to as a lambda-group, 250A, 250B, 250C and 250D. The circuit modules 106 are interconnected by an optical network 103. All the circuit modules 106 in one lambda-group communicate with circuit modules in another lambda-group using one wavelength. For example, circuit modules in lambda-group 250A communicate with circuit modules in lambda group 250C using spectral component (wavelength) λ5 communicate with circuit modules in lambda group 250B using λ3 and communicate with circuit modules in lambda-group 250D using λ4. Such configuration would require circuit module in lambda group 250A to be filter with three optical transceivers, one operating at wavelengths λ3, λ4 and λ5 each. Since all circuit modules in lambda group 250A are fitted with transceivers operating at identical set of wavelengths (λ3, λ4 and λ5), these circuit modules can also communicate among themselves using any one of these wavelengths. Therefore, each circuit module in lambda group 250A communicates with all other circuit modules in its network by suing only three wavelengths. In fact, all eight circuit modules in FIG. 12 would be communicate with each other while requiring only three wavelengths (and optical transceiver) per circuit module.

The preferred embodiment given in FIG. 12 can be generalized for a larger network with a large number of circuit modules. Let us assume that a network consists of C circuit modules grouped among L number of lambda-groups, each consisting of N circuit modules. This means, C=L*N. By definition, each lambda-group consists of a number of circuit modules that make use an identical set of wavelength to communicate with each other. The number of logic circuits needed for all circuit modules in each lambda group to communicate with all circuit modules in another lambda group is $N^2$. Let us assume that we make use of a group of wavelengths, referred to as lambda-trunk (252A through 252F in FIG. 12) such communications. Each network would need L*(L−1)/2 lambda-trunks.

Let us assume that each lambda-trunk makes use of Π number of unique wavelengths. The number of wavelengths Π in each lambda-trunk depends on the amount of communication required between a pair of lambda-groups, typically proportional to $N^2$, the number of circuits between a pair of lambda-group. The number of lambda-trunks connecting a lambda group 250A to all other lambda groups in a network is (L−1). Therefore, the number of transceiver (each using unique wavelength) each circuit module needs to be fitted with is given by Π (L−1). Since all N circuit modules in a lambda-group use Π (L−1) common set of wavelengths, all N circuit modules in each lambda-group can use any one of the common Π (L−1) wavelengths to communicate among themselves.

As an illustration of the benefit of the method described above, let us assume a network consisting of 400 circuit modules, each connected to 50 nodes, each generating 1 Gbps of data traffic (total of 20,000 nodes). Let us further assume that the 400 circuit modules are split among 50 lambda groups, each consisting of 8 circuit modules. Additionally, let us assume that we make use of optical transceivers that operate at data rates of 10 Gbps. Using lembda-group method described above, the network would need to make use of 2450 distinct wavelengths. However, each circuit module needs to make use of only 98 of these wavelengths, requiring only 98 transceivers per circuit module.

Span-Group Method

Another method for optimizing the spectral utilization is referred to as span-group method. The method is based on associating a group of circuit modules to what is referred to as a span-group. A span-group is a group of circuit modules that use a common wavelength (or a set of wavelengths) to communicate among themselves. A circuit module in a span-group is said to be member of a span-group and the wavelength is said to span the circuit modules in its corresponding span-group. The number of circuit modules in each span-group is based on the data capacity of each wavelength and the amount of data traffic among the member of the span-group. Each circuit module belonging a span-group is fitted with optical transceiver corresponding to the wavelength associated with it span-group. This would enable circuit modules in the same span-group to communicate with each other by using the wavelength associated with the span-group. By creating span-group such that every pair of circuit modules belongs to at least one span-group, we guarantee that every circuit module has a wavelength associated with to communicate with every other circuit module in the network. When every pair of circuit module is member of at least one span-group, the network is said to be completely spanned by the span-groups. By completely spanning the network with the smallest number of span-group, we minimize the number of wavelengths used. By minimizing the number of span-groups a circuit module belongs to, we minimize the number of optical transceiver needed by each circuit module.

A method of creating span-groups to completely span a network comprises of iteratively creating span-groups consists of a desired number of circuit modules such that the least number of circuit modules are common members of other span-groups and repeating this process until the network is completely spanned by the span-groups. An illustration of span-group method in a network comprising of twenty circuit modules is illustrated in Table 1 below. Each row of the table corresponds to a circuit modules (CM) and each column corresponds to a wavelength (designated by wavelength number 1 through 21). Each cell in the table is filled with a number corresponding to the wavelength assigned to the corresponding circuit module.

In this example, wavelength 1 (column 1) is assigned to a span-group that includes circuit modules CM1, CM2, CM3 and CM4. Wavelength 2 (column 2) is assigned to span group CM1, CM5, CM6, CM7 and CM8. In this example, a span group contains no more than five circuit modules. Furthermore, each circuit module is a member of no more than 5 span-groups. Therefore, a circuit module is not required use more than 5 wavelengths (and 5 optical transceivers). The network makes use of 21 distinct wavelengths.

TABLE 1

An illustration of a Span-Group Method.

|  | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|----|----|----|----|----|----|----|----|----|----|----|----|
| CM1 | 1 | 2 | 3 | 4 | 5 |   |   |   |   |    |    |    |    |    |    |    |    |    |    |    |    |
| CM2 | 1 |   |   |   |   | 6 | 7 | 8 | 9 |    |    |    |    |    |    |    |    |    |    |    |    |
| CM3 | 1 |   |   |   |   |   |   |   |   | 10 | 11 | 12 | 13 |    |    |    |    |    |    |    |    |
| CM4 | 1 |   |   |   |   |   |   |   |   |    |    |    |    | 14 | 15 | 16 | 17 |    |    |    |    |

TABLE 1-continued

An illustration of a Span-Group Method.

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| CM5  | 2 |   |   |   |   | 6 |   |   |   | 10 |    |    |    | 14 |    |    |    | 18 |    |    |    |
| CM6  | 2 |   |   |   |   |   | 7 |   |   |    | 11 |    |    |    | 15 |    |    |    | 19 |    |    |
| CM7  | 2 |   |   |   |   |   |   | 8 |   |    |    | 12 |    |    |    | 16 |    |    |    | 20 |    |
| CM8  | 2 |   |   |   |   |   |   |   | 9 |    |    |    | 13 |    |    |    | 17 |    |    |    | 21 |
| CM9  |   | 3 |   |   |   | 6 |   |   |   |    |    |    | 13 |    |    | 16 |    |    | 19 |    |    |
| CM10 |   | 3 |   |   |   |   | 7 |   |   | 10 |    |    |    |    |    |    | 17 |    |    | 20 |    |
| CM11 |   | 3 |   |   |   |   |   | 8 |   |    | 11 |    |    | 14 |    |    |    |    |    |    | 21 |
| CM12 |   | 3 |   |   |   |   |   |   | 9 |    |    | 12 |    |    | 15 |    |    | 18 |    |    |    |
| CM13 |   |   | 4 |   |   | 6 |   |   |   |    |    | 12 |    |    |    |    | 17 |    | 19 |    |    |
| CM14 |   |   | 4 |   |   |   | 7 |   |   |    |    |    | 13 | 14 |    |    |    |    |    | 20 |    |
| CM15 |   |   | 4 |   |   |   |   | 8 |   | 10 |    |    |    |    | 15 |    |    |    |    |    | 21 |
| CM16 |   |   | 4 |   |   |   |   |   | 9 |    | 11 |    |    |    |    | 16 |    | 18 |    |    |    |
| CM17 |   |   |   |   | 5 | 6 |   |   |   |    | 11 |    |    |    | 15 |    |    |    |    | 20 |    |
| CM18 |   |   |   |   | 5 |   | 7 |   |   |    |    | 12 |    |    |    | 16 |    |    |    |    | 21 |
| CM19 |   |   |   |   | 5 |   |   | 8 |   |    |    |    | 13 |    |    |    | 17 | 18 |    |    |    |
| CM20 |   |   |   |   | 5 |   |   |   | 9 | 10 |    |    |    | 14 |    |    |    |    | 19 |    |    |

Network Controller

Network controller 110 shown in FIG. 1 is responsible for assignments of circuits and maintaining the synchronization among all circuit modules and optical network elements (such as optical isolators). A network controller is a combination of hardware and software function that may be residing in a single dedicated computer, a group of computer or perhaps even distributed among the circuit modules. Circuits are assigned based many parameters such as the amount of bandwidth required between any two circuit modules, the amount of bandwidth available in the network and the amount of bandwidth already committed to other pairs. In the simplest scenario, all the circuits are assigned equal bandwidth. Because of the static nature of the datacenter network, circuit assignments are expected to remain static. However, they may be changed slowly over time as the network bandwidth need or topology chances. Furthermore, a pair of circuit module may be assigned more than one circuit between them. Assignment of multiple circuits allows for variable bandwidth between circuit modules and allow for dynamic nature of the circuits between them.

The maintenance of synchronization among circuit modules and some elements of optical network, such as optical isolators, is one of the key responsibilities of a network controller. Such synchronization may be maintained by distributing synchronization signals, such as a short pulse of optical signal, from network controller 110 to all circuit modules 106 and elements of optical network 103.

Power Consumption

Another benefit of all optical core network is a significant reduction in the power consumption by the networking equipment. With the exception of circuit modules, all other networking components are mostly passive and are not expected to consume significant amount of power. Power consumption of a circuit module is not expected to be more than that of a typical switch, about 100 Watts each, assuming that each circuit module aggregates data from about 128 nodes using 1 Gbps throughout. A data center with 20K computer would require about 157 such circuit modules. Therefore, the total power consumed by the edge of the network (consumed by all circuit modules) would be about 16 kilowatts. The power consumption by the all-optical core network is usually confined to power consumed by optical amplifiers. Let us assume that that there are 128 optical-spaces, each requiring about three fiber amplifiers, each with 17 dB of gain, (to account for ~30 dB in loss in signal splits among 157 CMs). With each fiber amplifier consuming 15 Watts of power (e.g. Cisco ONS 15501 Erbium Doped Fiber Amplifier), the total power consumed at the core of the proposed network is expected to be about 5 KWatts. Therefore, the total power consumed by the network using the proposed method is about 20 KWatts. This is only about 2.5 percent of the 850 KWatts of power consumed by a comparable size (20K computers) data center designed using today's state-of-the-art technologies. However, unlike the 850 KWatt network, which oversubscribed by a ratio of about 1.7:1 at 1 Gbps, the proposed network achieves oversubscription ratio of 1:1 at 1 Gbps and higher data rates.

SOME ADVANTAGES OF THE PRESENT INVENTION

Applicant believes that there are several reasons for the suitability of circuit switched network in such confined settings. One of the key reasons is the static nature of the network. Unlike a LAN or the Internet where new computers and users are added and removed constantly, data center networks are highly static in nature. Although, they are often expended by adding more equipment, such changes happen at a much slower pace than in case of LAN and the Internet. Another reason is that data center network communication is very simple. For a data center with as many as 20,000 servers, the need for communication is only among the 20,000 servers and not among millions of users as would be in case of the Internet. All the decisions being made by complex switches and routers are basically a very simple set of decisions. Much of power consumption that goes into today data center network is because of the packet processing that is involved at each stage of the network. All of these processing and the power consumptions could be avoided by making of use of all optical circuit switched network. Finally, the reason for the suitability of circuit switched network for data center applications is because of the fact that there is not much variability in the amount traffic flowing through different parts of the network. Such networks often operate under various load balancing schemes and balancing of network often fits within such scheme. It is for these reasons that we have developed the proposed method for data center networking.

Variations

Although the present invention is described above in terms of specific preferred embodiments, persons skilled in this art will recognize that there are many modifications that could be made within the general scope of this invention. For example, throughout this specification we illustrated the invention in terms of equipment circuit module that aggregates data packets from multiple nodes. However, the applicability and the innovativeness of the invention by making use of circuit modules that that generated data traffic instead of aggregating data traffic, as a server or data storage unit. Similarly, instead of connecting severs to a circuit module, packet switching networks (such as LAN) may also be connected to circuit module. In all these cases, circuit module servers the function of bringing together a packet switching network and the circuit switching network described in this document. Therefore the scope of the present invention should be determined by the appended claims and their legal equivalence.

What is claimed is:

1. A data center network comprising:
A) an all-optical core network comprising a plurality of separate all-optical networks,
B) a plurality of clusters of interconnected computer network equipment, each cluster of said plurality of interconnected computer network equipment defining a computer network cluster, each cluster of said computer network clusters comprising:
   i) a plurality of sets of data center equipment, each set of said plurality of sets of data center equipment defining a network node;
   ii) a circuit module comprising:
      a) a plurality of network interface units each unit adapted to provide a network interface with one of said network nodes within said cluster,
      b) a memory bank defining:
         1) a first plurality of memory circuit queues adapted to store information scheduled to be transmitted to said plurality of nodes within said cluster and
         2) a second plurality of memory circuit queues adapted to store information scheduled to be processed within said circuit module,
      c) a plurality of optical transceivers, each transceiver in said plurality of transceiver adapted to receive and transmit optical signals and to;
         1) produce such optical signals based on electrical signals communicated from said second memory circuit queue through an electrical data interface and
         2) produce electrical signals based on optical signals received by said circuit module from one of said all-optical networks within said core network,
      d) a lambda port module comprising:
         1) a plurality of optical mux-demux units defining a number of mux-demux units and an equal number of lambda ports, each of said lambda ports adapted to provide interface communication between said mux-demux units and said second memory bank via one of said plurality of optical transceivers,
         2) a plurality of optical couplers and a plurality of optical waveguides, each of said plurality of optical couplers being connected to each of said plurality of mux-demux units via a portion of said plurality of optical waveguides,
         3) a plurality of optical phi-ports, each of said plurality being adapted to provide communication between said circuit module via said optical couplers and each of said all-optical networks in said all-optical core network,
      e) a circuit module controller adapted to provide computer control to said memory bank, each transceiver in said plurality of transceivers and said lambda port module,
C) a plurality of optical waveguides connecting every phi port of each circuit module with each phi port of every other circuit module in the data center; and
D) a network controller adapted to control via said circuit module controller said memory bank and said lambda port module in each circuit module in the data center to create logic communication circuits between any circuit module in the data center network and any other circuit in the data center network.

2. The data center as in claim 1 wherein all logic communication circuits through said core network is all optical through said plurality of optical waveguides.

3. The data center as in claim 1 wherein said optical waveguides are optical fibers.

4. The data center as in claim 1 wherein each transceiver in the plurality of transceivers in each circuit module is adapted to transmit and receive within separate optical frequency bands that are the same as the receive and transmit optical frequency bands at which the plurality of transceivers in all of the other circuit modules in the data center network are adapted to receive and transmit.

5. The data center as in claim 1 wherein each circuit module is adapted to transmit information in periodic intervals defining time frames, with each time frame divided into a plurality of sub-frames, defining sub-slots.

6. The data center as in claim 1 wherein said plurality of separate optical networks within the core network is at least three optical networks, said plurality of transceivers in each of said circuit modules is four transceivers and said plurality of sub-slots is ten.

7. The data center as in claim 4 wherein the optical network frequency band of each optical network is defined by a span group.

* * * * *